US010176477B2

(12) United States Patent
Killian et al.

(10) Patent No.: US 10,176,477 B2
(45) Date of Patent: Jan. 8, 2019

(54) METHODS AND SYSTEMS FOR UNIVERSAL PAYMENT ACCOUNT TRANSLATION

(75) Inventors: Patrick L. Killian, St. Peters, MO (US); Sandeep Malhotra, Ballwin, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 619 days.

(21) Appl. No.: 12/947,395

(22) Filed: Nov. 16, 2010

(65) Prior Publication Data
US 2012/0123940 A1     May 17, 2012

(51) Int. Cl.
*G06Q 20/40*          (2012.01)

(52) U.S. Cl.
CPC .................. *G06Q 20/40* (2013.01)

(58) Field of Classification Search
CPC ........ G06Q 20/04; G06Q 40/02; G06Q 20/40; G06Q 30/06; G06Q 20/385; G06Q 20/32; G06Q 20/382; G06Q 20/02; G06Q 50/01; G06Q 20/0855; G06Q 20/383; G06Q 20/3674; G06Q 20/3821; G06Q 20/10; G06Q 20/4012; G06Q 20/223; G06Q 20/425; G06Q 40/00; G07F 7/08; G07F 7/10; G07F 7/122; H04L 51/32; H04L 63/0421; H04L 9/32; H04L 9/3226; G06F 21/31
See application file for complete search history.

(56) References Cited

U.S. PATENT DOCUMENTS

| | | | |
|---|---|---|---|
| 5,883,810 A | 3/1999 | Franklin et al. |
| 5,953,710 A | 9/1999 | Fleming |
| 6,018,717 A | 1/2000 | Lee et al. |
| 6,163,771 A | 12/2000 | Walker et al. |
| 6,609,113 B1 | 8/2003 | O'Leary et al. |

(Continued)

FOREIGN PATENT DOCUMENTS

WO      0116768 A1     3/2001

OTHER PUBLICATIONS

International Search Report and Written Opinion issued in PCT Application No. PCT/US 11/60554, dated Mar. 2, 2012, 21 pages.

*Primary Examiner* — Robert R Niquette
*Assistant Examiner* — Carol A See
(74) *Attorney, Agent, or Firm* — Armstrong Teasdale LLP

(57) ABSTRACT

A method and system of transferring value from a payer participant of a first online community website to a payee participant of a second online community website through a payment account translation system is provided. The method includes initiating a first payment request, validating that the payer and payee are registered participants of the online community, translating the payer alias into a payer pseudo-account number using business rules and community participant profiles associated with the community website from which the payment request is made, and mapping the payer pseudo-account number to a respective funding/repository account primary account number (PAN). The method further includes transmitting the PANs and a validation code to a payments network for processing through the payments network and approving the transfer of value from the payer to the payee such that the PAN of the payer is unknown to the community website.

12 Claims, 10 Drawing Sheets

(56) References Cited

U.S. PATENT DOCUMENTS

| | | |
|---|---|---|
| 6,636,833 B1 | 10/2003 | Flitcroft et al. |
| 6,938,022 B1 | 8/2005 | Singhal |
| 6,990,470 B2 | 1/2006 | Hogan et al. |
| 7,099,850 B1 | 8/2006 | Mann, II et al. |
| 7,103,576 B2 | 9/2006 | Mann, III et al. |
| 7,292,999 B2 | 11/2007 | Hobson et al. |
| 7,379,919 B2 | 5/2008 | Hogan et al. |
| 7,380,710 B2 | 6/2008 | Brown |
| 7,472,829 B2 | 1/2009 | Brown |
| 7,567,936 B1 | 7/2009 | Peckover et al. |
| 7,575,177 B2 | 8/2009 | Killian et al. |
| 7,627,531 B2 | 12/2009 | Breck et al. |
| 7,640,193 B2 | 12/2009 | Crespo et al. |
| 7,797,202 B1 * | 9/2010 | Hinckley et al. ............. 705/26.1 |
| 8,229,852 B2 * | 7/2012 | Carlson ............................ 705/44 |
| 2002/0007320 A1 | 1/2002 | Hogan et al. |
| 2002/0095387 A1 | 7/2002 | Sosa et al. |
| 2002/0152180 A1 * | 10/2002 | Turgeon ................. G06Q 20/04 705/72 |
| 2003/0126094 A1 | 7/2003 | Fisher et al. |
| 2004/0143532 A1 | 7/2004 | Lee |
| 2006/0004663 A1 | 1/2006 | Singhal |
| 2006/0076400 A1 * | 4/2006 | Fletcher ................. G06Q 20/12 235/379 |
| 2007/0170247 A1 | 7/2007 | Friedman |
| 2007/0255620 A1 | 11/2007 | Tumminaro et al. |
| 2008/0010190 A1 | 1/2008 | Rackley, III et al. |
| 2008/0040274 A1 * | 2/2008 | Uzo ....................... G06Q 20/40 705/44 |
| 2008/0065554 A1 | 3/2008 | Hogan et al. |
| 2008/0126116 A1 | 5/2008 | Singhai |
| 2008/0154772 A1 * | 6/2008 | Carlson ................. G06Q 20/04 705/44 |
| 2008/0249908 A1 | 10/2008 | Lorberg et al. |
| 2008/0249909 A1 | 10/2008 | Lorberg et al. |
| 2008/0249910 A1 | 10/2008 | Hill et al. |
| 2008/0249928 A1 | 10/2008 | Hill et al. |
| 2008/0249929 A1 | 10/2008 | Hill et al. |
| 2008/0249930 A1 | 10/2008 | Hill et al. |
| 2008/0262964 A1 | 10/2008 | Bezos et al. |
| 2008/0319905 A1 | 12/2008 | Carlson |
| 2009/0090783 A1 | 4/2009 | Killian et al. |
| 2009/0094123 A1 | 4/2009 | Killian et al. |
| 2009/0094125 A1 | 4/2009 | Killian et al. |
| 2009/0094126 A1 | 4/2009 | Killian et al. |
| 2009/0132417 A1 | 5/2009 | Scipioni et al. |
| 2009/0182664 A1 * | 7/2009 | Trombley .............. G06Q 10/10 705/42 |
| 2009/0266884 A1 | 10/2009 | Killian et al. |
| 2009/0281948 A1 * | 11/2009 | Carlson ................. G06Q 20/10 705/44 |
| 2010/0042515 A1 | 2/2010 | Crespo et al. |
| 2010/0131397 A1 | 5/2010 | Killian et al. |
| 2010/0216425 A1 | 8/2010 | Smith |

* cited by examiner

METHODS AND SYSTEMS FOR UNIVERSAL PAYMENT ACCOUNT TRANSLATION

BACKGROUND OF THE INVENTION

The field of the invention relates generally to commerce conducted within an online community or between online communities, and more specifically, to methods and systems of universal payment account translations for facilitating transactions between community participants within an online community or between participants in different online communities.

A developing phenomenon on the Internet is community participants and businesses forming and participating in virtual communities organized by various site sponsors, including but not limited to, social networks, messaging sites (e.g., Blackberry Messenger), and gaming sites. For example, community participants use social networking sites/messaging networks as part of their daily life to stay in touch with friends and family. Businesses and professionals use business networking sites/business networks to stay informed and in touch with other business professionals. At least some community participants are regular shoppers on favorite retail sites, and use search engine sites and retail aggregators as "trusted" portals to other Internet shopping sites. Finally, at least some other community participants are members and repeat participants at gaming sites, where gaming sites may include role playing games, first person action games, simulation games, and gambling games.

Many community participants access more than one community-oriented site. For example, a given individual may be a registered member of Facebook.com, MySpace.com, and Twitter.com. The same individual may be listed on multiple other individuals' messenger contacts lists. That same individual may also be a member of Linkedin.com in a professional capacity. That same community participant may shop at Amazon.com, use e-mail and search services from Google.com or Yahoo.com and may be an avid and repeat participant at Worldofwarcraft.com (gaming site).

The technology used by community participants and business community participants to access community-oriented sites is also evolving from the traditional home PC to include new mobile access devices. Such devices include mobile phones and Smartphones, PDAs, and netbook computers.

There is a growing desire for community participants and businesses to conduct commerce with each other (as opposed to with the site operator) while interacting at community sites. Specifically, there is a desire for community participants to be able to (a) pay each other (person-to-person), (b) make purchases from member and non-member merchants, (c) make charitable donations and contributions to various charities, and (d) buy virtual currency or virtual goods and services for use while interacting at the respective community site.

In response to the desire for conducting commerce at community sites, many site organizers are creating new proprietary payment systems and are acting as a Payment Service Provider (PSP) in an effort to better serve community commerce requirements. At least some of the proprietary payment systems being offered by a PSP for community sites typically follow one of two generic models, namely, an Externally Linked Funding Account (ELFA) or an Internal Stored Value Account (ISVA).

In an ELFA, the proprietary payment capability offered by the PSP is linked to an existing payment or funding account managed by a third party. Such externally managed payment and funding accounts may include the community participant's payment card account (credit, debit, and prepaid) or bank Demand Deposit Account (DDA), and the account information is often stored by the PSP to facilitate site payments. When a participant makes or receives a payment via the community PSP, the funds are either debit or credited to the underlying payment card account or DDA.

In an ISVA, the proprietary payment capability offered by the PSP is linked to an internally managed stored value account managed by the PSP. The "value" stored in the account may represent actual money, "virtual money" that may only be used at the community site, or some other form of value with local significance only (such as game credits, or use credits). While community participants may fund the stored value account from external payment card accounts or their DDA, commerce payments made at the site are debited or credited to the participants proprietary stored value account.

The current proprietary payment system models present a number of structural problems that decrease the value of the payment service to both participants and the PSP, and as a result inhibit community commerce.

A fundamental problem of the externally linked funding account model is that this model requires the community participant's personal payment card account or DDA data to be stored or "left" in many places under the control of third parties (i.e., the PSP). As the number of community sites storing the community participants' personal data increases, so do the odds that payment data will be compromised. This increasing risk of compromise is well understood by community participants and leads to the perception of increased risk of identity theft. The risk of identity theft or the perceived risk of identity theft is one of today's major barriers to Internet commerce in general, and leads to reduced community participant adoption of community commerce.

In contrast to the ELFA model, the ISVA model may reduce the risk of identity theft and the compromise of personal data. However, the ISVA model results in reduced convenience for community participants and reduced control of their money. As the number of community sites grows where a community participant conducts commerce, the community participant is forced to disburse their money in an ever increasing number of isolated payment accounts. In doing so, community participants loose the ability to use their funds for purposes other than at the respective account site, and they have difficulty tracking the balances of those multiple isolated accounts.

Moreover, linking the site payment capability to external funding accounts, as provided in the ELFA model reduces the amount of value that can be added by the PSP and limits the ultimate control of the PSP over their payments value proposition. Such a method prevents the site host or PSP from basing the user value proposition on site-defined payment business rules and prevents the PSP from authenticating the community participant as the owner of the underlying payment account. This method also inhibits the PSP in differentiating the community participant payment experience and inhibits the PSP from creating site brand value associated with that payment capability.

In contrast, operating an ISVA model provides the ultimate degree of freedom for the PSP to define their payment value proposition, but such proprietary systems decrease the utility value of the payment service to community participants. Proprietary stored value accounts inhibit interoperability with other community site payment systems and inhibit the community participants' ability to transact with participants from other community sites.

Accordingly, what is needed is a method and system that provides security against identity theft by protecting community participant account data while also providing interoperability among multiple community sites.

BRIEF DESCRIPTION OF THE INVENTION

In one embodiment, a method of transferring value from a payer participant of a first online community website to a payee participant of a second online community website through a payment account translation system includes initiating a first payment request at a first payer payment application including inputting a payer alias, a payer secret code, a payee alias, and payment data using a mobile or PC browser client, wherein the payer alias and payer secret code are selected by the payer during a first registration of the payer with the online community website. The community website having been previously registered with the payment account translation system and wherein the payee alias is selected by the payee during a second registration process with the community website.

The method also includes validating that the payer and payee are registered participants of the online community, translating the payer alias into a payer pseudo-account number using business rules and community participant profiles associated with the community website from which the payment request is made, and mapping the payer pseudo-account number to a respective funding/repository account primary account number (PAN).

The method further includes transmitting the PANs and a validation code to a payments network for processing through the payments network, approving the transfer of value from the payer to the payee such that the PAN of the payer is unknown to the community website.

In another embodiment, a method of registering a participant of an online community website for conducting commerce through the online community website includes receiving registration information including an alias name of a potential online community participant and funding account payment credentials associated with the potential online community participant, validating the funding account payment credentials based on a primary account number (PAN) or DDA, and generating a pseudo account number associated with validated funding account payment credentials. The method also includes associating the pseudo account number with the alias and transmitting to the potential online community participant a registration result.

In yet another embodiment, a non-transient computer readable medium encoded with a program is configured to instruct a computer to receive a first payment request initiated at a first payer payment application including a payer alias, a payer secret code, a payee alias, and payment data, the first payer payment application executed using a mobile or PC browser client, wherein the payer alias and payer secret code are selected by the payer during a first registration of the payer with an online community website. The community website having been previously registered with a payment account translation system and wherein the payee alias is selected by the payee during a second registration process with the community website.

The medium is further encoded with a program is configured to instruct a computer to validate that that the payer and payee are registered participants of the online community, translate the payer alias into a payer pseudo-account number using business rules and community participant profiles associated with the community website from which the payment request is made, and map the payer pseudo-account number to a respective funding/repository account primary account number (PAN).

The medium is also encoded with a program is configured to instruct a computer to transmit the PAN and a validation code to a payments network for processing through the payments network and approve the transfer of value from the payer to the payee such that the PAN of the payer is unknown to the community website.

BRIEF DESCRIPTION OF THE DRAWINGS

FIG. 1 is a schematic diagram illustrating an exemplary multi-party payment card industry system for enabling ordinary payment-by-card transactions in which merchants and card issuers do not necessarily have a one-to-one relationship;

FIG. 2 is a simplified block diagram of an exemplary payment card system in accordance with one embodiment of the present invention;

FIG. 3 is an expanded block diagram of an exemplary embodiment of a server architecture of a payment card system in accordance with one embodiment of the present invention;

FIG. 4 is a block diagram of an exemplary embodiment of a community participant computer device as shown in FIGS. 2 and 3;

FIG. 5 is a block diagram of an exemplary embodiment of a server computer device as shown in FIGS. 2 and 3;

FIG. 6 is a flow diagram showing a method of Universal Payment Account Translation Service (UPATS) registration, which may be implemented using the system shown in FIGS. 2 and 3;

FIG. 7 is a flow diagram showing a method for intra-site Person to Person/Peer-to-Peer (P2P) payment, which may be implemented using the system shown in FIGS. 2 and 3;

FIG. 8 is a flow diagram showing a method for an inter-site Person to Person/Peer-to-Peer (P2P) payment process, which may be implemented using the system shown in FIGS. 2 and 3;

FIG. 9 is a flow diagram showing a method for an intra-site purchase process using the UPATS, which may be implemented using the system shown in FIGS. 2 and 3; and FIG. 10 is a flow diagram showing a method for an inter-site purchase process, which may be implemented using the system shown in FIGS. 2 and 3.

DETAILED DESCRIPTION OF THE INVENTION

Figure 1:
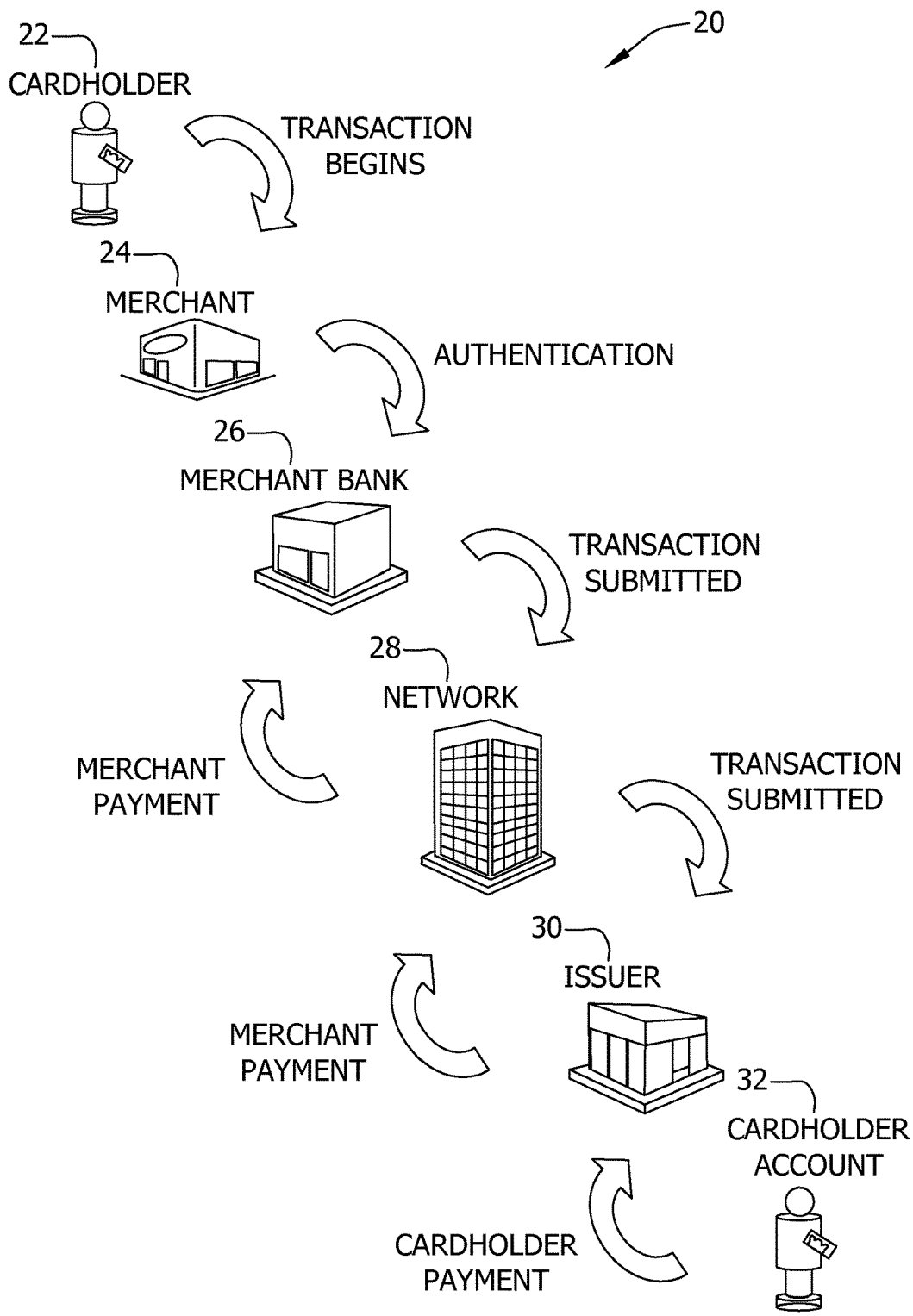
FIGS. 1-10 show exemplary embodiments of the method and system described herein.

Embodiments of the methods and systems described herein facilitate communication of transaction data from a payer using a community website that may be associated with social media, gaming, entertainment, or other non-primarily commerce related activities. One community participant may send a payment to another community participant at any of a plurality of registered websites or to a community site payment system to conduct a financial transaction with the community site or a merchant. The system also uses an existing payments network, an acquiring bank, and/or an issuing bank via a cardholder device to facilitate the transactions. In some embodiments, the community site uses a community participant alias and security code to generate a pseudo-account number which is then passed to a payment translation service that converts the pseudo-account number to a primary account number for use in completing the transaction in the existing payments network.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: (a) using a transaction participant alias as a public payment identity to maintain secrecy of a Payment Service Provider (PSP)-specific payment account number (pseudo-account number), (b) preventing wrongly acquired payment credentials or data compromise from a given site from being used in other payment channels or at other community or merchant sites, (c) reducing the impact of compromise of data to the respective site because the PSP-specific pseudo-account number has only local significance to the respective community or merchant site.

Embodiments of the present invention provide for a Universal Payment Account Translation Service (UPATS) used in conjunction with existing card account payment systems and conventions, provide a means to better support commerce transacted on a community website while protecting the individual community participant's identity and personal data, and provide a number of methods to better support intra-community and inter-community payments.

The UPATS system described herein may be at least partially summarized in a community participant registration process and payment processes using the UPATS. The payment processes describe several possible payment scenarios, including an intra-site Person-to-Person/Peer-to-Peer (P2P) payment process, an inter-site Person-to-Person/Peer-to-Peer (P2P) payment process, an intra-site purchase process, and an inter-site purchase process.

FIG. 1 is a schematic diagram 20 illustrating an exemplary multi-party payment card industry system for enabling ordinary payment-by-card transactions in which merchants and card issuers do not necessarily have a one-to-one relationship. The present invention relates to a payment card system, such as a credit card payment system using the MasterCard® payment system. The MasterCard® payment system is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, New York).

In a typical payment card system, a financial institution called the "issuer" issues a payment account card, such as a credit card account or a debit card account, to a community participant, who uses the payment account card to tender payment for a purchase from a merchant. To accept payment with the payment account card, the merchant must normally establish an account with a financial institution that is part of the financial payment system. This financial institution is usually called the "merchant bank" or the "acquiring bank" or "acquirer bank." When a community participant 22 tenders payment for a purchase with a payment account card (also known as a financial transaction card), the merchant 24 requests authorization from the merchant bank 26 for the amount of the purchase. The request may be performed over the telephone, but is usually performed through the use of a point-of-sale terminal, which reads the community participant's account information from the magnetic stripe on the payment account card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange 28, the computers of the merchant bank or the merchant processor will communicate with the computers of the issuer bank 30 to determine whether the community participant's account is in good standing and whether the purchase is covered by the community participant's available credit line or account balance. Based on these determinations, the request for authorization will be declined or accepted. If the request is accepted, an authorization code is issued to the merchant.

When a request for authorization is accepted, the available credit line or available balance of community participant's account 32 is decreased. Normally, a charge is not posted immediately to a community participant's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a community participant cancels a transaction before it is captured, a "void" is generated. If a community participant returns goods after the transaction has been captured, a "credit" is generated.

For debit card transactions, when a request for a PIN authorization is approved by the issuer, the community participant's account 32 is decreased. Normally, a charge is posted immediately to a community participant's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

Financial transaction cards or payment account cards can refer to credit cards, debit cards, and prepaid cards. These cards can all be used as a method of payment for performing a transaction. As described herein, the term "financial transaction card" or "payment account card" includes cards such as credit cards, debit cards, and prepaid cards, but also includes any other devices that may hold payment account information, such as mobile phones, personal digital assistants (PDAs), and key fobs.

Figure 2:
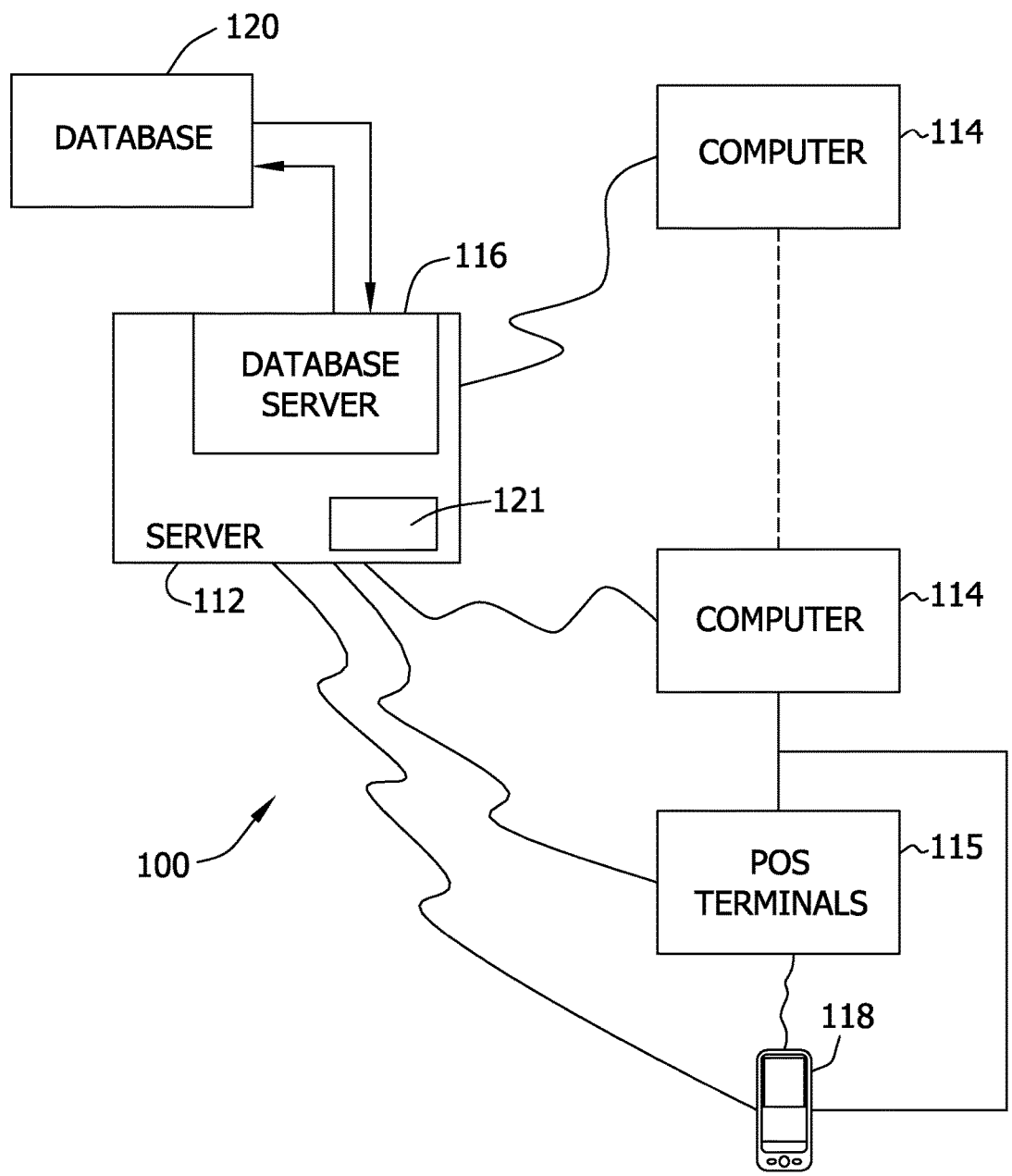

FIG. 2 is a simplified block diagram of an exemplary payment account card system 100 in accordance with one embodiment of the present invention. System 100 is a payment account card system, which can be utilized by account holders as part of a process of initiating an authorization request and performing a transaction as described below.

More specifically, in the example embodiment, system 100 includes a server system 112, which is a type of computer system, and a plurality of client sub-systems (also referred to as client systems 114) connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed ISDN lines. Client systems 114 could be any device capable of interconnecting to the Internet including a web-based phone, personal digital assistant (PDA), or other web-based connectable equipment.

System 100 also includes point-of-sale (POS) terminals 115, which are connected to client systems 114 and may be connected to server system 112. POS terminals 115 are interconnected to the Internet through many interfaces including a network, such as a local area network (LAN) or a wide area network (WAN), dial-in-connections, cable modems, wireless modems, and special high-speed ISDN lines. POS terminals 115 could be any device capable of interconnecting to the Internet and including an input device capable of reading information from a community participant's financial transaction card.

A database server 116 is connected to database 120, which contains information on a variety of matters, as described below in greater detail. In one embodiment, centralized database 120 is stored on server system 112 and can be accessed by potential community participants at one of client systems 114 by logging onto server system 112 through one of client systems 114. In an alternative embodiment, database 120 is stored remotely from server system 112 and may be non-centralized. Database 120 may store transaction data generated as part of sales activities conducted over the bankcard network including data relating to merchants, account holders or customers, and purchases. Database 120 may also store account data including at least one of a cardholder name, a cardholder address, an account number, and other account identifier. Database 120 may also store merchant data including a merchant identifier that identifies each merchant registered to use the payment account card network, and instructions for settling transactions including merchant bank account information. In one embodiment, a universal payment account translation service (UPATS) 121 is stored on server system 112 and can be accessed by potential community participants at one of client systems 114 by logging onto server system 112 through one of client systems 114.

System 100 also includes at least one input device 118, which is configured to communicate with at least one of POS terminal 115, client systems 114 and server system 112. In the exemplary embodiment, input device 118 is associated with or controlled by a cardholder making a purchase using a payment account card and payment account card system 100. Input device 118 is interconnected to the Internet through many interfaces including a network, such as a local area network (LAN) or a wide area network (WAN), dial-in-connections, cable modems, wireless modems, and special high-speed ISDN lines. Input device 118 could be any device capable of interconnecting to the Internet including a web-based phone, personal digital assistant (PDA), or other web-based connectable equipment. Input device 118 is configured to communicate with POS terminal 115 using various outputs including, for example, Bluetooth communication, radio frequency communication, near field communication, network-based communication, and the like.

In the example embodiment, one of client systems 114 may be associated with an acquirer while another one of client systems 114 may be associated with an issuer, POS terminal 115 may be associated with a merchant, input device may be associated with a cardholder, and server system 112 may be associated with the payment system network.

Figure 3:
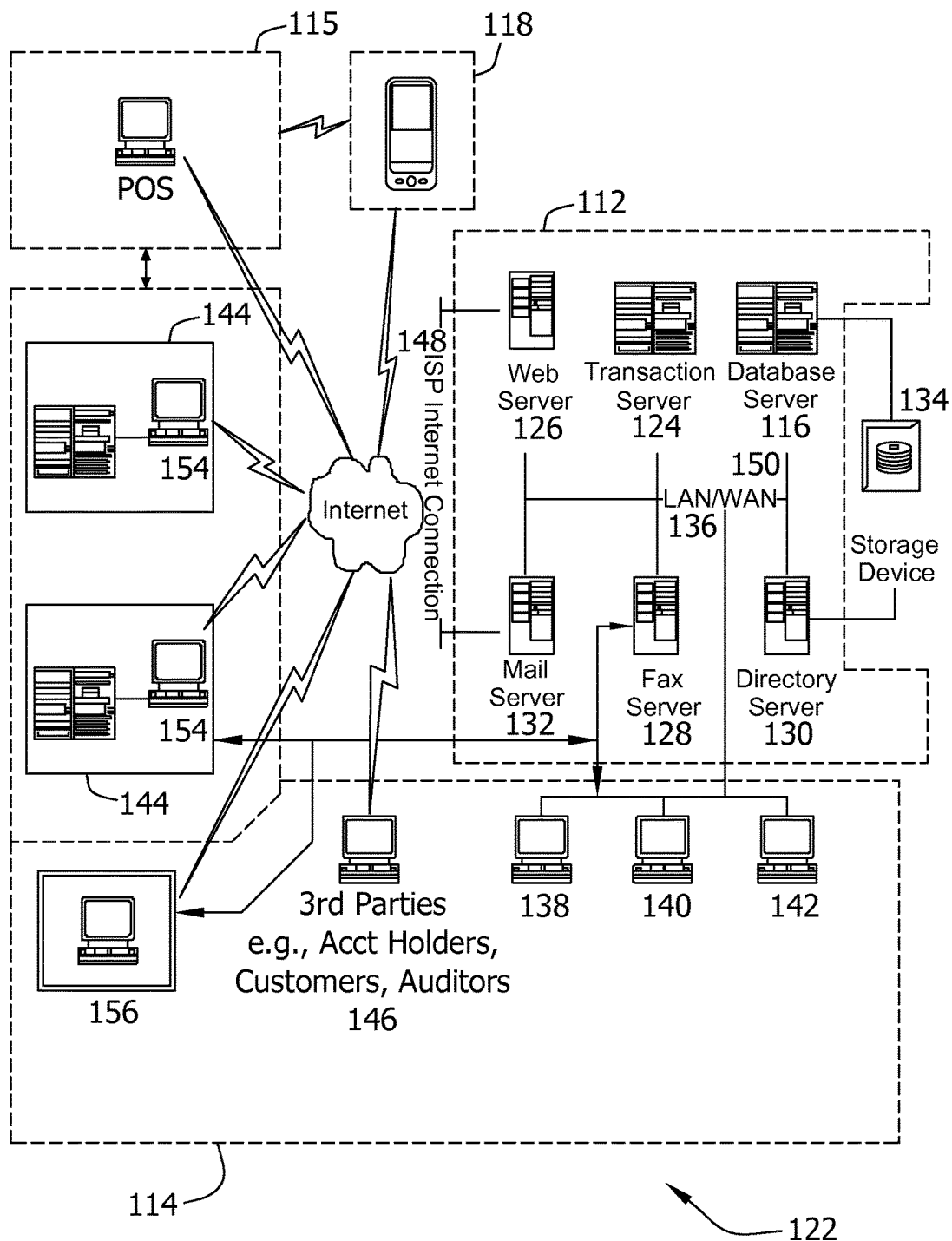

FIG. 3 is an expanded block diagram of an exemplary embodiment of a server architecture of a payment account card system 122 in accordance with one embodiment of the present invention. Components in system 122, identical to components of system 100 (shown in FIG. 3), are identified in FIG. 4 using the same reference numerals as used in FIG. 3. System 122 includes server system 112, client systems 114, POS terminals 115, and input devices 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a community participant workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
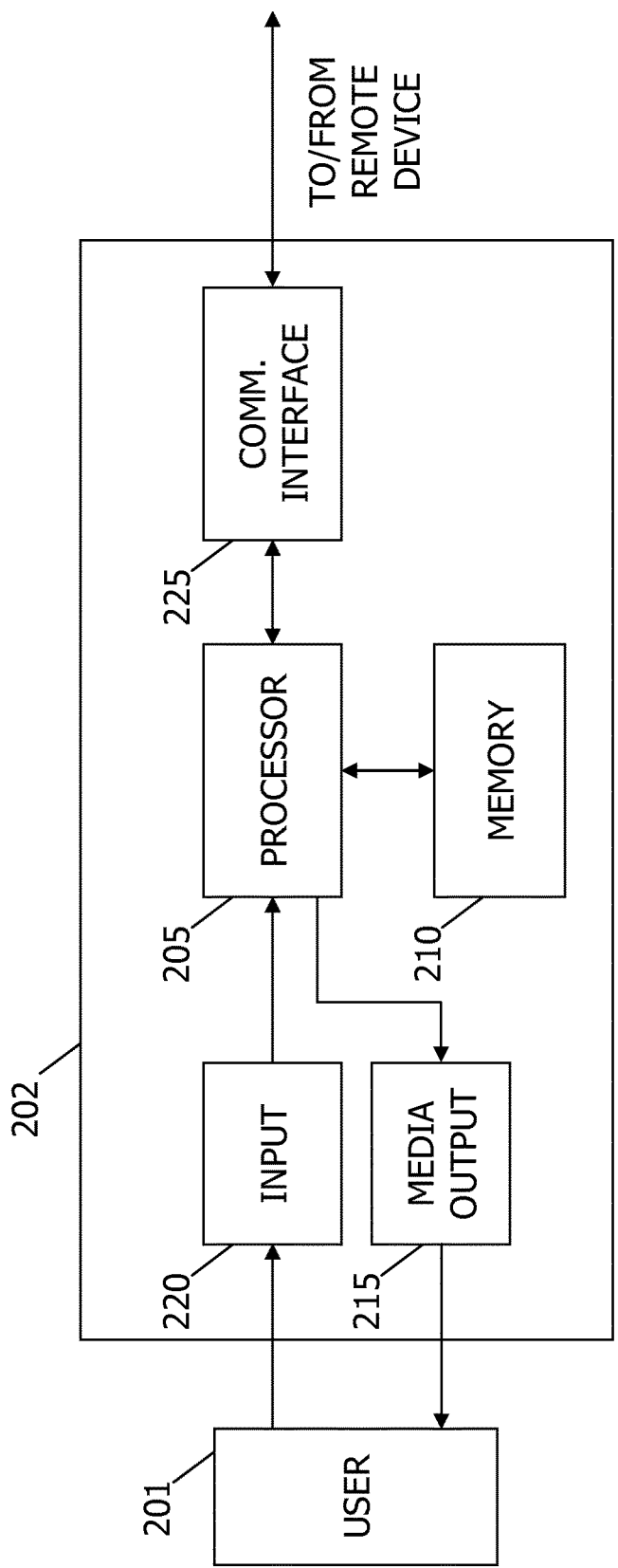

FIG. 4 illustrates an exemplary configuration of a community participant computer device 202 operated by a community participant 201. Community participant computer device 202 may include, but is not limited to, client systems 114, 138, 140, and 142, POS terminal 115, input device 118, workstation 154, and manager workstation 156 (shown in FIG. 3).

Community participant computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

Community participant computer device 202 also includes at least one media output component 215 for presenting information to community participant 201. Media output component 215 is any component capable of conveying information to community participant 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, community participant computer device 202 includes an input device 220 for receiving input from community participant 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Community participant computer device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to community participant 201 via media output component 215 and, optionally, receiving and processing input from input device 220. A user interface may include, among other possibilities, a web browser and client application. Web browsers enable community participants, such as community participant 201, to display and interact with media and other information typically embedded on a web page or a website from server system 112. A client application allows community participant 201 to interact with a server application from server system 112.

Figure 5:
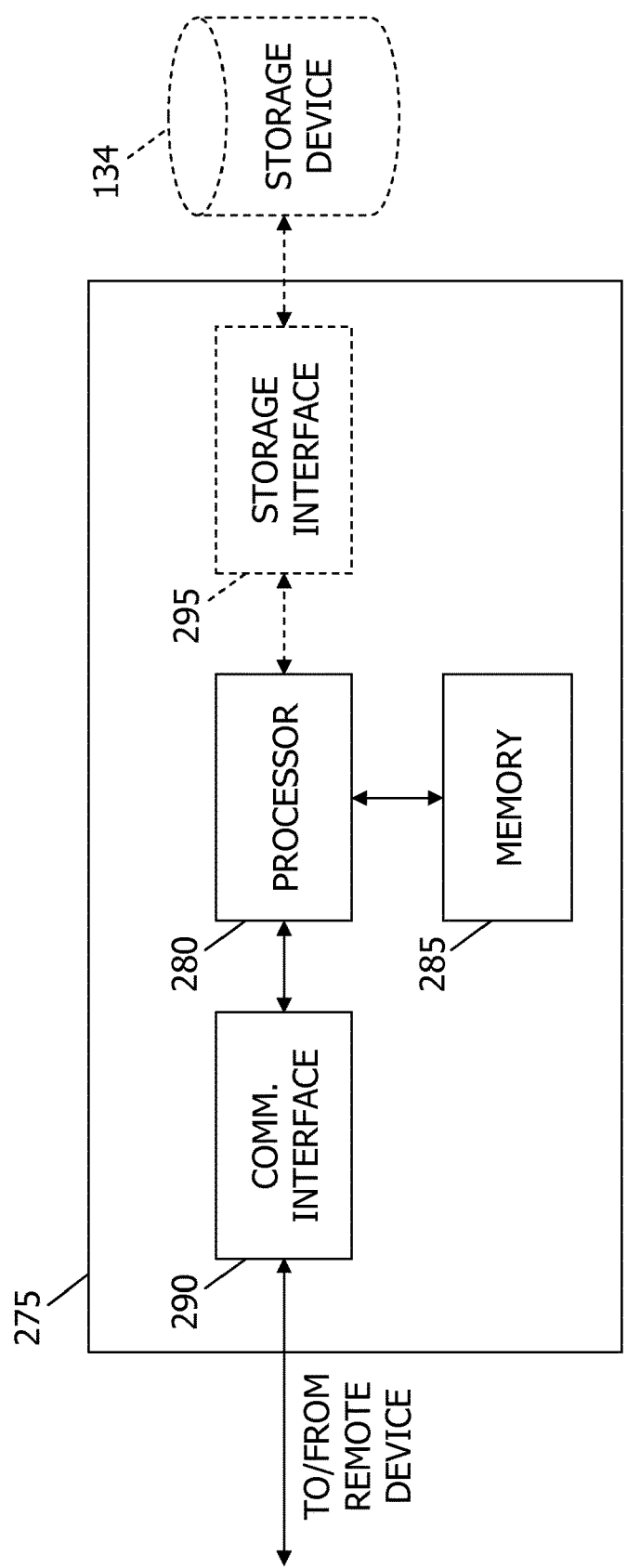

FIG. 5 illustrates an exemplary configuration of a server computer device 275 such as server system 112 (shown in FIGS. 2 and 3). Server computer device 275 may include, but is not limited to, database server 116, transaction server 124, web server 126, fax server 128, directory server 130, and mail server 132.

Server computer device 275 includes a processor 280 for executing instructions. Instructions may be stored in a memory area 285, for example. Processor 280 may include one or more processing units (e.g., in a multi-core configuration).

Processor 280 is operatively coupled to a communication interface 290 such that server computer device 275 is capable of communicating with a remote device such as community participant computer device 202 or another server computer device 275. For example, communication interface 290 may receive requests from client systems 114 or input device 118 via the Internet, as illustrated in FIGS. 2 and 3.

Processor 280 may also be operatively coupled to a storage device 134. Storage device 134 is any computer-operated hardware suitable for storing and/or retrieving data. In some embodiments, storage device 134 is integrated in server computer device 275. For example, server computer device 275 may include one or more hard disk drives as storage device 134. In other embodiments, storage device 134 is external to server computer device 275 and may be accessed by a plurality of server computer devices 275. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 280 is operatively coupled to storage device 134 via a storage interface 295. Storage interface 295 is any component capable of providing processor 280 with access to storage device 134. Storage interface 295 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 280 with access to storage device 134.

Memory areas 210 and 285 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
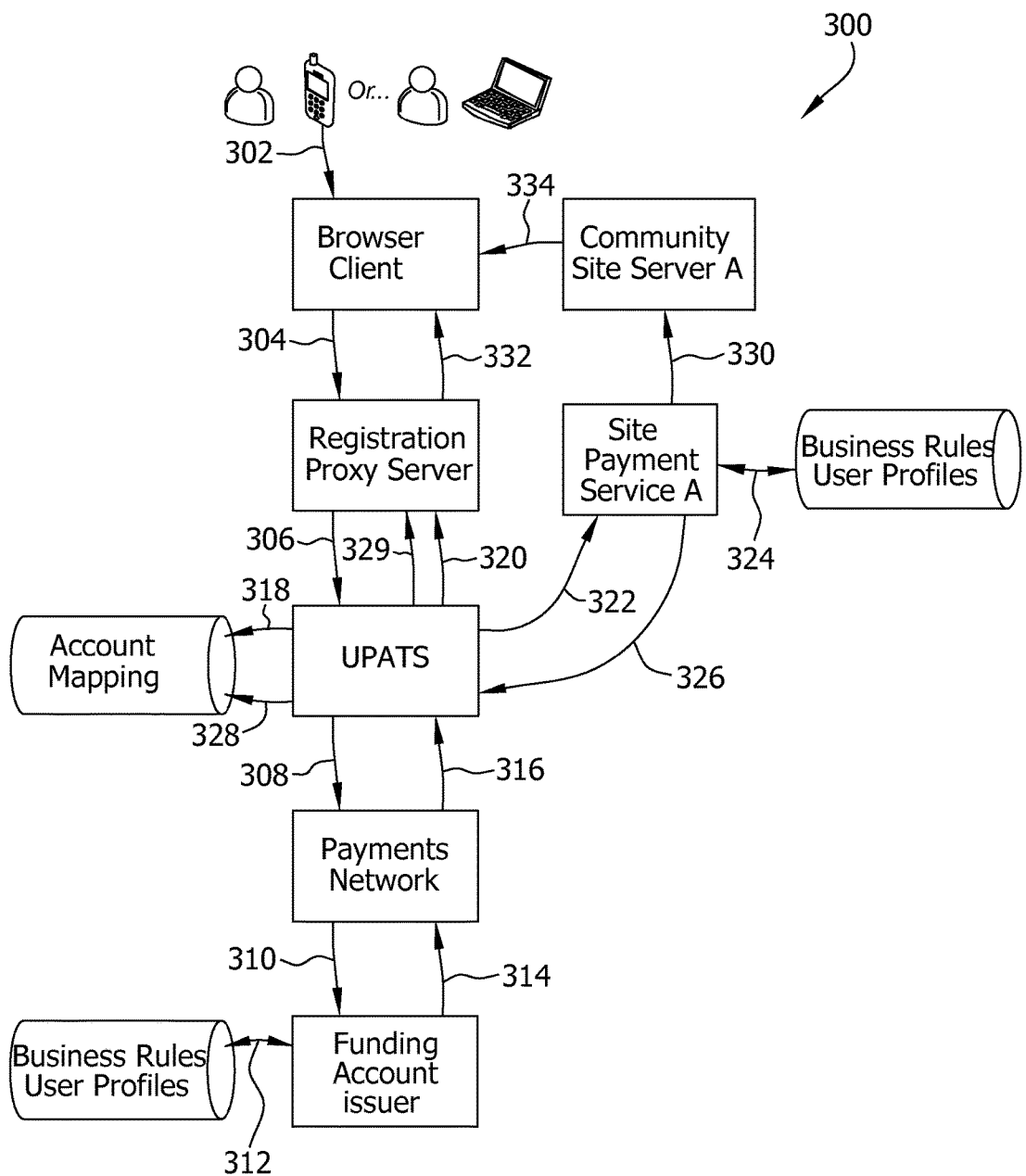

FIG. 6 is a flow diagram showing a method 300 of Universal Payment Account Translation Service (UPATS) registration, which may be implemented using the system shown in FIGS. 2 and 3. In the exemplary embodiment, a community participant initiates 302 a registration from mobile or PC browser client system, inputs registration information required by a community site and/or a site payment service including a site-specific alias name, and inputs required funding account payment credentials. The browser client routes 304 the registration information to a registration proxy server operated by a trusted agent, including but not limited to UPATS, a funding account issuer (i.e., bank web site), or a funding account issuer agent. The registration proxy server routes 306 registration information to UPATS. UPATS generates 308 a payment authorization request message including a funding account primary account number (PAN), and routes the authorization message to the payments network. The payments network routes 310 the payment authorization request message to the funding account issuer based on the funding account PAN.

In method 300, the mobile or PC browser client system may include client system 114 or input device 118. The payments network may include server system 112. Community site server may include client system 114 and site payment service may include POS terminal 115.

The funding account issuer validates 312 the payment credentials, applies business rules, and approves or declines the payment authorization request. The funding account issuer transmits 314 a payment authorization response message with an approval or a decline to the payments network. The payments network routes 316 the payment authorization response to UPATS. If the payment authorization response is an approval, UPATS generates 318 a community participant profile in an account mapping data store, generates a site specific pseudo-account number, and writes the PAN to the pseudo-account number mapping to account mapping data store. If the payment authorization request response is a decline, UPATS transmits 320 the declined payment authorization request response to the registration proxy server.

UPATS generates a community participant registration message request and routes 322 the community participant registration message request to a site payment service based on the community participant alias name. The site payment service applies business rules to the registration data, and writes 324 a community participant site specific alias name, community participant registration data, and site specific pseudo-account number to community participant profile data store. The site payments service transmits 326 a community participant registration response to UPATS. If the community participant registration response from site payment service is approval, UPATS activates 328 community participant profile in the account mapping data store. If the community participant registration response from the site payment service is decline, UPATS deletes the community participant profile in the account mapping data store. UPATS transmits 329 the community participant registration disposition message (approval or decline) to the registration proxy server.

Upon successful community participant registration, site payment server transmits 330 a community site server registration disposition message. The registration proxy server transmits 332 the registration disposition message to the community participant browser for display to the community participant. Upon next community participant sign-on to the community site, the community site server transmits 334 a registration notification message to the community participant browser for display to the community participant.

Figure 7:
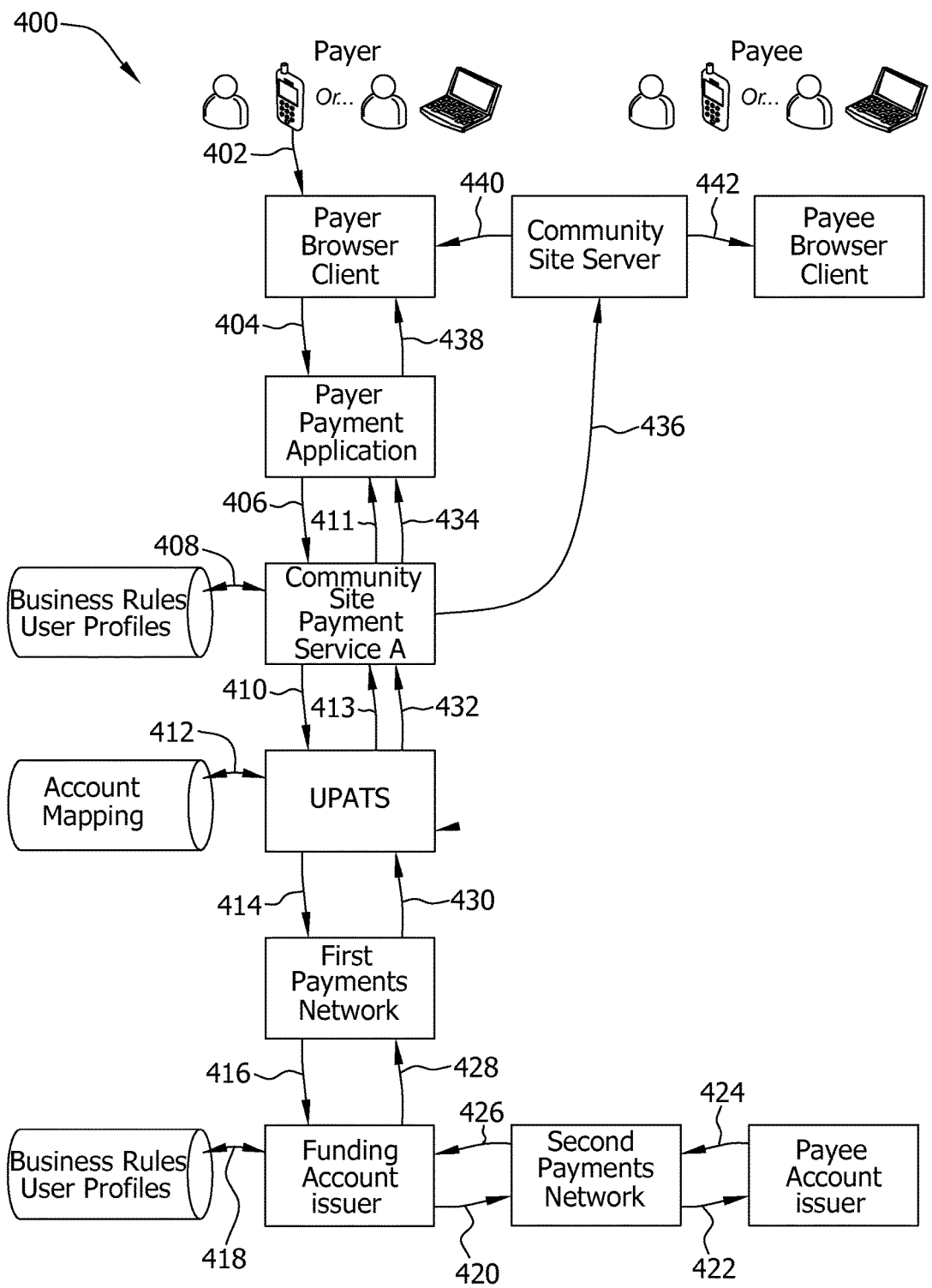

FIG. 7 is a flow diagram showing a method 400 for an intra-site Person to Person/Peer-to-Peer (P2P) payment, which may be implemented using the system shown in FIGS. 2 and 3. In the exemplary embodiment, a payer initiates 402 a payment using a mobile client application or PC browser client system and inputs a secret code used for community participant authentication. The payer browser client system routes 404 the payment initiation to a payer payment application. The payer payment application initiates 406 a payment request and routes the payer and the payee "alias" and payment data with the encrypted secret code to a community site payment service A. The community site payment service A validates 408 payer and payee as being registered community participants using the aliases and secret code, and translates payer and payee aliases to payer and payee pseudo-account numbers using business rules and community participant profiles.

If the validation is successful, the community site payment service A routes 410 a payment request with payer and payee pseudo-account numbers and payer's encrypted secret code to UPATS. If the validation fails, community site payment service A returns 411 a failure disposition message to the payer payment application. UPATS maps 412 payer and payee pseudo-account numbers to funding/repository account PANs, validates payer's secret code by matching the received code to the stored value of the secret code. If the validation fails, UPATS returns 413 a failure disposition message to the community site payment service A.

UPATS reformats 414 the payment request to an ISO 8583 authorization request with the PAN for transmission to a first payments network, including a validation code as confirmation the payee's secret code was authenticated. The payments network routes 416 the payment request to an originating issuer based on the payer PAN. The funding account issuer authenticates 418 the payer PAN and applies funding account business rules. If payee is "off-us", the funding account issuer routes 420 an ISO 8583 authorization request to a second payments network with the payee PAN.

The second payments network routes 422 an authorization request to the payee account issuer based on the payee PAN. The payee account issuer responds 424 to the second payments network with an approval or a decline authorization response. The second payments network routes 426 an authorization response to the funding account issuer. The funding account issuer routes 428 an approval or a decline authorization response to the first payments network. The first payments network routes 430 an authorization response to UPATS. UPATS remaps 432 the funding account PANs to the pseudo-account numbers, routes an authorization response to the originating community site payment service A. The community site payment service A remaps 434 the pseudo-account number to the alias and routes a payment disposition notification to the payer payment application. The site payment service routes 436 a payment disposition notification to the community site server. The payer payment application displays 438 the payment disposition notification on a payer browser client. Upon next community participant sign-on to the community site or via external messaging such as e-mail or text messaging, the community site server transmits 440 a site-specific payment notification to payer browser client and upon next community participant sign-on to the community site or via external messaging such as e-mail or text messaging, the community site server transmits 442 the payment notification to the payee browser client.

Figure 8:
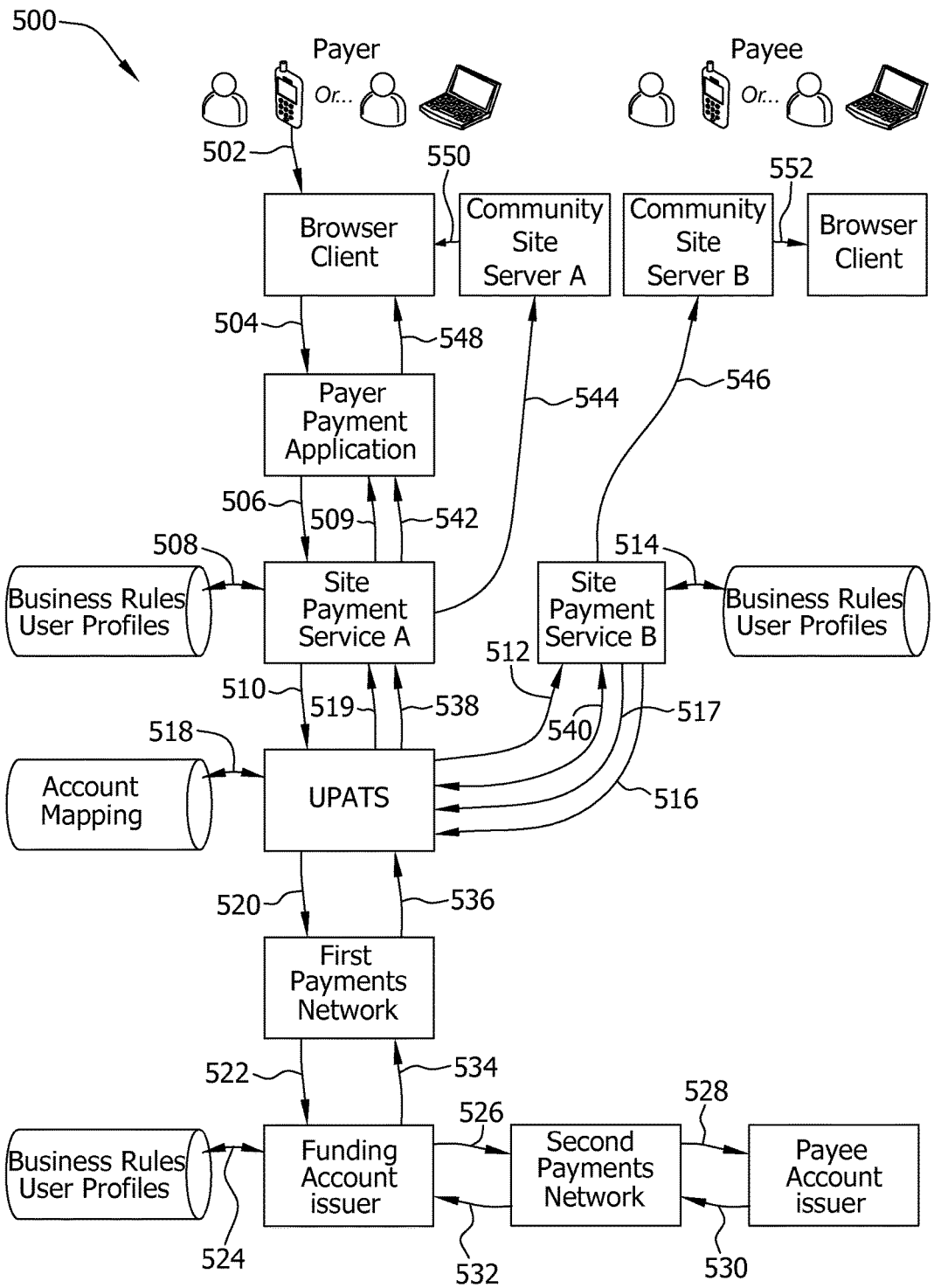

FIG. 8 is a flow diagram showing a method 500 for an inter-site Person to Person/Peer-to-Peer (P2P) payment process flow, which may be implemented using the system shown in FIGS. 2 and 3. In the exemplary embodiment, method 500 includes a payer initiating 502 a payment via a mobile or PC browser payer client system and inputting a secret code. The browser payer client system routes 504 a payment initiation to the mobile or PC payer payment application. The payer payment application initiates a payment request and routes 506 the payer and the payee "alias", and payment data with the encrypted secret code to a community site payment service A. The site payment service A validates 508 that the payer is a registered community participant, and translates the payer alias to a payer pseudo-account number. If the validation fails, the community site payment service A returns 509 a failure disposition message to the payer payment application and the process skips ahead to step 542.

The community site payment service A routes 510 a payment request with the payer pseudo-account number and a payee alias, and the encrypted secret code to UPATS. UPATS routes 512 the payee alias translation request to a payee site payment service B. Site payment service B validates 514 the payee is registered community participant, and translates the payee alias to a payee pseudo-account number. If the validation fails, the community site payment service B returns 516 a failure disposition message to UPATS. Otherwise, the site payment service B responds 517 to UPATS with the payee pseudo-account number.

UPATS maps 518 the payer and the payee pseudo-account numbers to respective funding/repository account PANs, validates that the payer's secret code secret code by matching the received code to the stored value of the secret code. If the validation fails, UPATS returns 519 a failure disposition message to the community site payment service A.

UPATS reformats 520 the payment request to an ISO 8583 authorization request with the PAN to the payments network, including a validation code as confirmation that the payee secret code was authenticated. The payments network routes 522 the authorization request to an originating issuer based on the payer PAN. The funding account issuer authenticates 524 the payer PAN and applies funding account business rules. If the payee is "off-us", the funding account issuer routes 526 the ISO 8583 authorization request to a payments network with the payee PAN. The payments network routes 528 the authorization request to the payee account issuer based on the payee PAN.

The payee account issuer responds 530 to the payments network with an approval or a decline authorization response. The payments network routes 532 the authorization response to the funding account issuer. The funding account issuer routes 534 an approval or a decline authorization response to the payments network. The payments network routes 536 an authorization response to UPATS. UPATS remaps the funding account PAN to the payer pseudo-account number, and routes 538 the authorization response to the originating community site payment service A. UPATS remaps 540 the payee account PAN to the payee pseudo-account number, and routes the authorization response to the payee site payment service B.

Site payment service A remaps 542 the payer pseudo-account number to the payer alias and routes a payment disposition notification to the payer payment application. Site payment service A routes 544 the payment disposition notification to community site server A. Site payment service B routes 546 the payment disposition notification to community site server B. The payer payment application displays 548 the payment disposition notification on a payer browser client and upon the next community participant sign-on to community site payment service A or via external messaging such as e-mail or text messaging, community site server A transmits 550 site-specific payment notification to the payer browser client. Upon the next community participant sign-on to community site payment service B, the community site server B transmits 552 a site-specific payment notification to a payee browser client.

Figure 9:
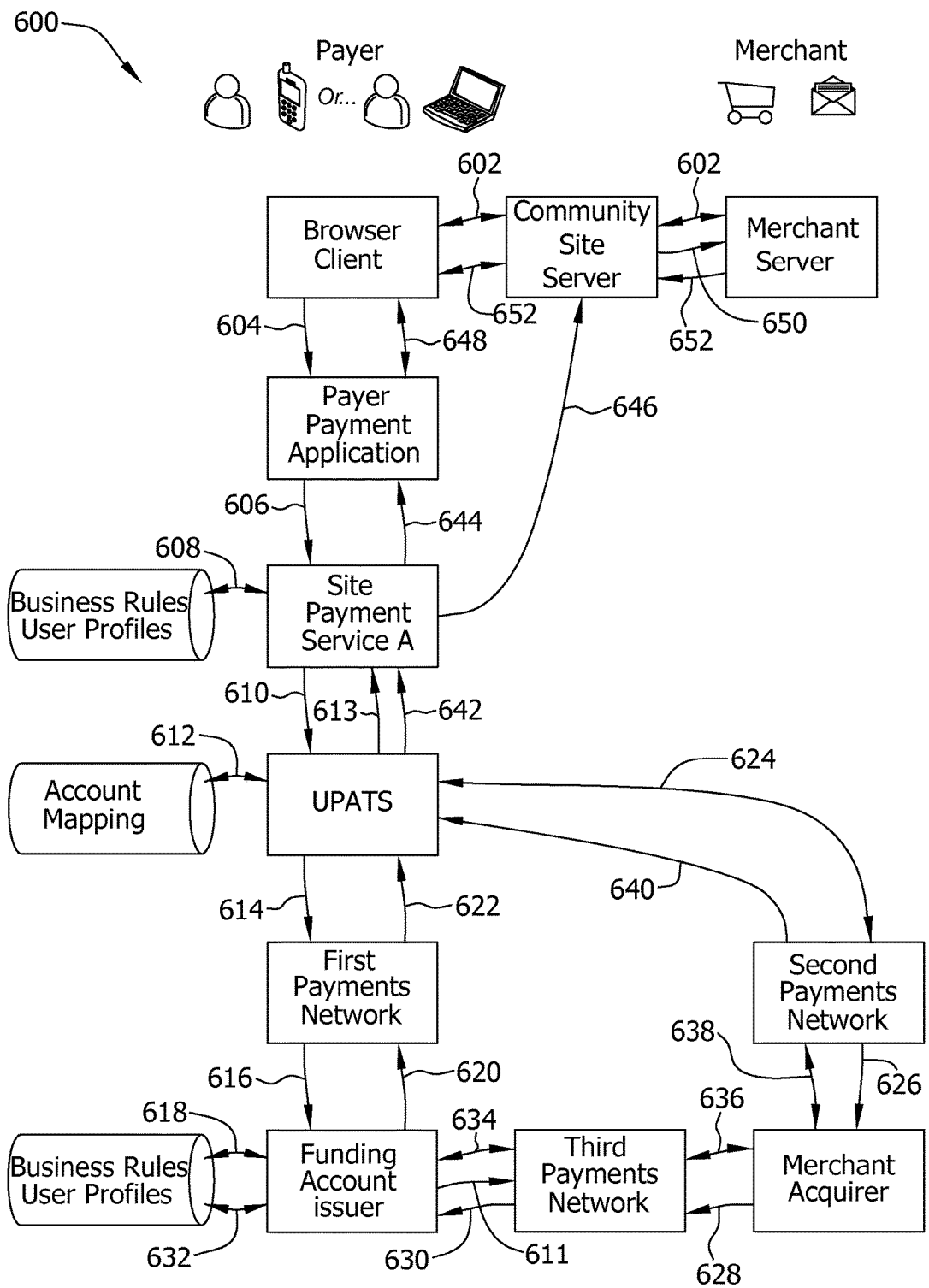

FIG. 9 is a flow diagram showing a method 600 for an intra-site purchase process using the UPATS, which may be implemented using the system shown in FIGS. 2 and 3. In the exemplary embodiment, method 600 includes a payer shopping 602 at a merchant site via a community site, the merchant provides checkout info with merchant ID or merchant alias name, unique "order number" identifying the purchase, and the amount of purchase via the community site.

The payer initiates 604 a payment via mobile or PC browser client application, inputs a secret code, the browser client routes the payment initiation to a mobile or PC client payer payment application. The payer payment application initiates 606 a payment request and routes payer and merchant "alias," and payment data with the encrypted secret code to community site payment service A.

Community site payment service A validates 608 that the payer and the merchant are registered community participants, and translates payer and merchant aliases to payer pseudo-account numbers and merchant ID. If the validation is successful, community site payment service A routes 610 a payment request with the payer pseudo-account numbers and the payer's encrypted secret code, and the merchant ID to UPATS. If the validation fails, the funding account issuer returns 611 a failure disposition message to the third payments network and the process jumps ahead to step 634.

UPATS maps 612 the payer pseudo-account numbers to funding/repository account PANs, validates that the payer's secret code by matching the received code to the stored value of the secret code, maps the merchant ID to the acquirer merchant ID. If the validation fails, UPATS returns 613 a failure disposition message to the site payment service A and the process jumps ahead to step 632.

UPATS reformats the payment request to an ISO 8583 validation request with PAN and secret code and transmits 614 the reformatted payment request to a first payments network, including the validation code as confirmation that the payee was authenticated via the secret code. The first payments network routes 616 the request to the funding account issuer based on the payer PAN. The funding account issuer authenticates 618 the payer PAN and appends the secret code if required. The funding account issuer returns 620 an approval with the issuer validation code to the first payments network.

The first payments network routes 622 an authentication approval to UPATS. If the issuer authentication is successful, UPATS initiates 624 an ISO 8583 authorization request to a second payments network with purchase data including an acquirer merchant ID, PAN, and issuer validation code. The second payments network routes 626 an authorization request to a merchant acquirer based on the acquirer merchant ID. The merchant acquirer submits 628 a standard authorization request with the payer PAN, and the merchant issuer validation code to a third payments network. The third payments network routes 630 an authorization request to the funding account issuer based on the PAN. The funding account issuer applies 632 business rules and determines an approval or a decline of the authorization request. The funding account issuer responds 634 to the third payments network with an approval or a decline authorization response.

The third payments network routes 636 the authorization response to the merchant acquirer. The merchant acquirer routes 638 a merchant authorization response to the second payments network. The second payments network routes 640 the merchant authorization response to UPATS. UPATS remaps 642 the funding account PAN to the pseudo-account numbers and acquirer merchant ID to merchant ID, and routes the authorization response to the originating site payment service A. The site payment service A remaps 644 the pseudo-account number to the alias and routes the payment disposition notification to the payer payment application. The site payment service routes 646 the merchant payment disposition notification to the community site server. The payer payment application displays 648 a payment disposition notification on the payer browser client. The community site server transmits 650 the payment disposition notification to the merchant server. The community site server transmits 652 a payment confirmation to the payer browser via the community site server.

Figure 10:
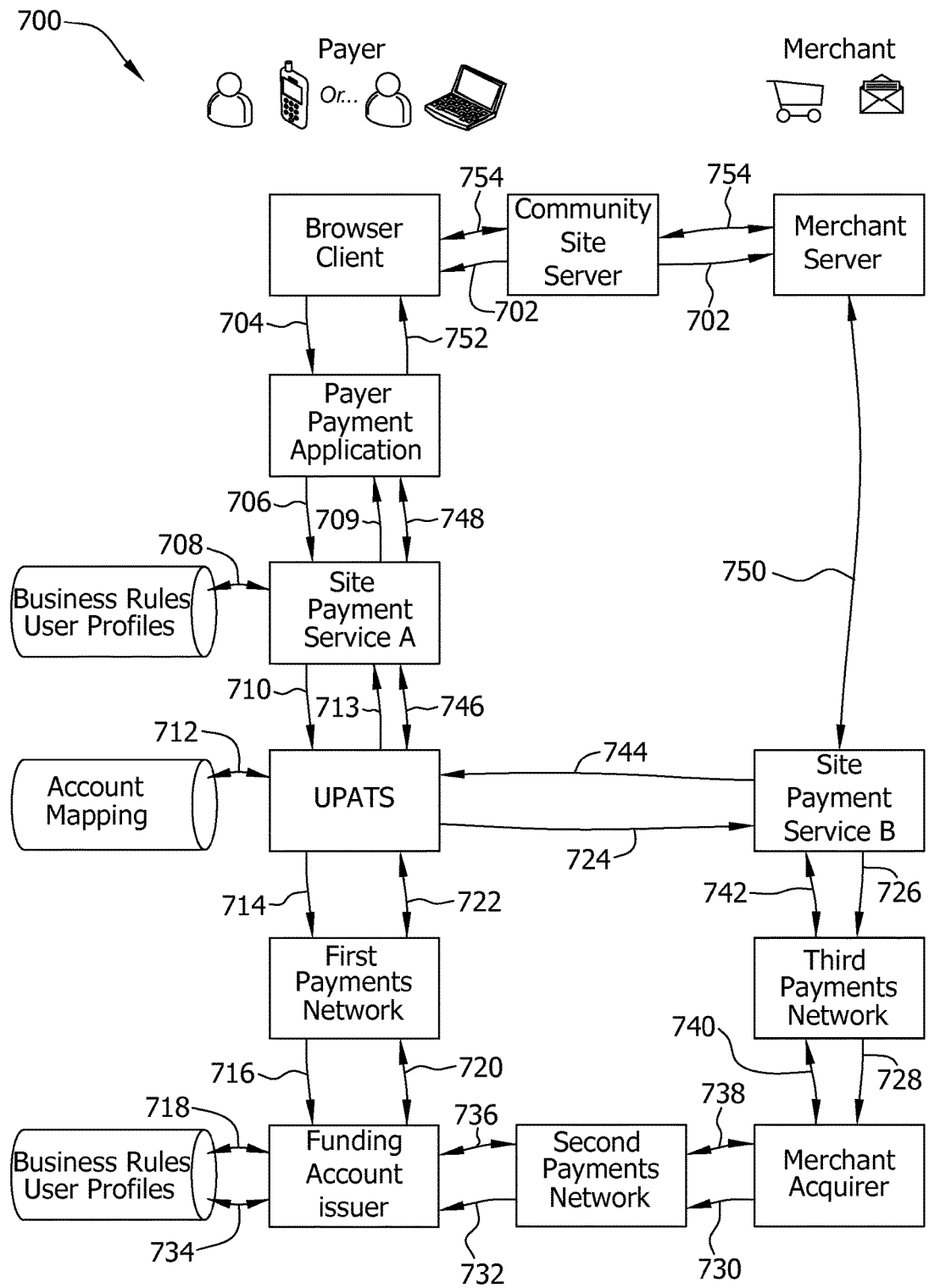

FIG. 10 is a flow diagram showing a method 700 for an inter-site purchase process, which may be implemented using the system shown in FIGS. 2 and 3. In the exemplary embodiment, method 700 includes a payer shopping 702 at a merchant site via a community site, the merchant site provides checkout information with a unique "order number" identifying the purchase, the merchant ID or alias name, and amount via the community site. The payer initiates 704 a payment via a mobile or a PC browser client application, inputs a secret code, the browser client routes a payment initiation to the mobile or PC client payment application. The payer payment application initiates 706 a payment request and routes the payer and the merchant "alias," and payment data with the encrypted secret code to the community site payment service A. The community site payment service A validates 708 that the payer and merchant are registered community participants, and translates the payer and merchant aliases to payer pseudo-account numbers and a merchant ID.

If validation 708 is successful, the community site payment service A routes 710 a payment request with the payer pseudo-account numbers and the payer's encrypted secret code, and the merchant ID to UPATS. If validation 708 fails, site payment service A returns 709 a failure disposition message to the payer payment application and the process skips ahead to step 748.

UPATS maps 712 the payer pseudo-account numbers to funding/repository account PANs, validates the payer's secret code by matching the received code to the stored value of the secret code and maps the merchant ID to an acquirer merchant ID. If the payer's secret code validation fails, UPATS returns 713 a failure disposition message to site payment service A and the process skips ahead to step 746.

UPATS reformats 714 the payment request to an ISO 8583 validation request with PAN and secret code to a first payments network, including the validation code as confirmation that the payee authenticated via secret code. The first payments network routes 716 the ISO 8583 validation request to a funding account issuer based on the payer PAN. The funding account issuer authenticates 718 the payer PAN and appends the secret code if required. The funding account issuer returns 720 an approval with an issuer validation code to the first payments network. The first payments network routes 722 the authentication approval to UPATS. If the issuer authentication is successful, UPATS initiates 724 a merchant authorization request to site payment service B with purchase data including merchant ID, PAN, and an issuer validation code. Payment Service B maps validates 726 the merchant ID as a registered community participant, maps the merchant ID to the acquirer merchant ID, routes the merchant authorization request with an issuer validation code to a third payments network. The third payments network routes 728 the merchant authorization request to the merchant acquirer based on the acquirer merchant ID. The merchant acquirer submits 730 a standard authorization request with the payer PAN, and the issuer validation code to the second payments network.

The second payments network routes 732 merchant authorization request to the funding account issuer based on the PAN. The funding account issuer applies 734 business rules and determines an approval or a decline. The payer account issuer responds 736 to the second payments network with an approval or a decline authorization response. The payments network routes 738 the authorization response to the merchant acquirer. The merchant acquirer routes 740 the merchant authorization response to the third payments network. The third payments network routes 742 the merchant authorization response to Payment Service B. Payment Service B routes 744 the merchant authorization response to UPATS. UPATS remaps 746 the funding account PAN to the pseudo-account number, routes the authorization response to the originating site payment service. Site payment service A remaps 748 the pseudo-account number to the alias and routes a payment disposition notification to the payer payment application. Payment service B routes 750 a merchant payment disposition notification to the merchant server. The payer payment application displays 752 the payment disposition notification on the payer browser client. The merchant server transmits 754 a payment confirmation to the payer browser via the community site server A.

As described above, the use of an account translation service, such as UPATS, permits the use of site-specific public payment identities (aliases) of participants, and the use of PSP-specific non-public payment account numbers (pseudo-account numbers) to act as buffers to the participants underlying payment account data and reduce the potential for payment data compromise and the threat of identity theft.

The use of a participant's alias as a public payment identity enables the PSP-specific payment account number (pseudo-account number) to remain a secret to the PSP. The PSP-specific pseudo-account number has only local significance to the respective community or merchant site. In that illicitly acquired payment credentials or data compromise from a given site could not be used in other payment channels or at other community or merchant sites, thus reducing the impact of compromise to that site.

Closing or blocking of a site-specific payment account as a result of compromise or potential compromise does not impact or limit the participant's ability to pay at other community or merchant sites or via other channels using the underlying payment account card account or bank Demand Deposit Account (DDA). Similarly, compromise of a participant's site-specific pseudo-account number account data at a given community or merchant site would not compromise the participant's underlying payment account card account or DDA, thus protecting against the threat of identity theft.

The use of a single underlying payment account linked to multiple site-specific payment account numbers enables the community participant to better utilize and manage their funds while enabling the community participant to use those funds for payments at many community sites and enables community participants to store and receive funds in and to a common account for use at multiple sites thus eliminating the need to spread their funds in individual site-specific stored value accounts.

Using the account translation service, rather than a stored value account at multiple community or merchant sites, community participants have access to all of their funds from any community or merchant site or from traditional channels rather than those funds being "locked-up" at a given community or merchant site stored value account. Community participants can also more easily stayed informed of the availability of their total funds and can more easily control their funds in a single underlying payment account rather than having those funds disbursed over a number of site specific stored value accounts.

The use of a site-specific pseudo-account number linked to an underlying payment account enables a given community site PSP to create a differentiated "virtual" payment service without the need for managing actual funds in a stored value account or having knowledge of the underlying payment account details. It also enables the PSP to retain control of the site-specific payment services without controlling or assuming payment risk of the underlying payment account and to define proprietary business rules in support of the PSP's unique payment offer and value proposition.

Using the site-specific pseudo-account number linked to an underlying payment account also enables the PSP to enable community participants to self-define payment account rules, including but not limited to payment limits, acceptable payees, and activity alerts and enables the PSP to authenticate the site participant against site-specific payment credentials in order to reduce the risk of site originated payment fraud. In addition, using the site-specific pseudo-account number linked to an underlying payment account also enables the PSP to create unique payment capability features that differentiate the site-specific payment service while still utilizing the common core functionality of the underlying payment capability and enables the PSP to "brand" the site-specific payment capability while still utilizing the underlying payment account for payment fulfillment.

The use of a common underlying payment account linked to site-specific public payment identities (aliases) of participants increases the utility value of the community site payment service by enabling payments interoperability between different community sites and between the community site payment service and traditional payments networks. Moreover, the use of a common underlying payment account linked to site-specific aliases enables a participant of one community site to pay a participant of another community site using only the respective site-specific aliases of the payee and payer, and without requiring knowledge of each party's underlying payment account details and enables community site participants to pay traditional merchants and others using the community site payment service where the underlying payment account is accepted by the payee.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processors 205 and/or 280, including RAM memory, ROM memory, EPROM memory, EEPROM memory, and non-volatile RAM (NVRAM) memory. The above memory types are exemplary only, and are thus not limiting as to the types of memory usable for storage of a computer program.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of transferring value from a payer participant of a first online community website to a payee participant of at least one of the first online community website and a second online community website through a payment account translation computer system, the payment account translation computer system being in operable communication with the first and second online community websites and an electronic payments network, the electronic payments network including at least one memory for storing a plurality of primary account numbers (PANs), each PAN being associated with a respective funding account, said method comprising:

establishing a payer alias and a payer secret code for the payer participant, and a payee alias for the payee participant;

translating, by an online community website payment service associated with the first online community website, the payer alias into a payer pseudoaccount number and the payee alias into a payee pseudo-account number;

transmitting, from the online community website payment service to the payment account translation computer system, a payment request including the payer pseudo-account number, the payee pseudo-account number, and the payer secret code;

mapping, by the payment account translation computer system, the payer pseudoaccount number to a corresponding PAN stored within the memory of the electronic payments network;

validating, by the payment account translation computer system, the payer secret code, further comprising the substeps of comparing the payer secret code with a stored value for the payer secret code and generating a validation code confirming a match of the payer secret code with the stored value;

reformatting, by the payment account translation computer system, the payment request into an authorization request message using a standard interchange payment message format;

transmitting, by the payment account translation computer system, the authorization request message to the electronic payments network for processing a value transfer through the electronic payments network, from the authorization request message, the authorization request message including the generated validation code and the corresponding PAN; and routing, from the electronic payments network, the authorization request message to an issuer computer device based on the corresponding PAN.

2. A method in accordance with claim 1, further comprising receiving a second payment request at a second online community website payment service of a second online community website, wherein a second payer alias used by the payer at the second online community website is associated with the corresponding PAN.

3. A method in accordance with claim 1, wherein at least one of the first online community website and the second online community website operate a proprietary payment system to define business rules and capabilities applied to payment activity specific to that online community website.

4. A method in accordance with claim 1,
wherein the payer associates the payer alias and the payer secret code with a payment card account or bank Demand Deposit Account (DDA) as the funding account for use with the online community website payment service, wherein payment credentials of the funding account are unknown to the online community website payment service.

5. A method in accordance with claim 1,
further comprising communicating the payer pseudo-account number to the online community website payment service during a registration process in which the payer alias, the payer secret code, and the payee alias are established.

6. A method in accordance with claim 1,
further comprising:
receiving, by the payment account translation computer system, from the payments network, a payment authorization response message including the corresponding PAN;
remapping the corresponding PAN to the payer pseudo-account number; and
transmitting a payment disposition notification message to the online community website payment service.

7. A method in accordance with claim 1,
further comprising:
determining that the payer secret code does not match the stored value for the secret code; and
transmitting a failure disposition message to the online community website payment service.

8. A non-transitory computer readable medium encoded with a program configured to instruct a payment account translation computer to, when the payment account translation computer is in operable communication with a first online community website and an electronic payments network including at least one memory for storing a plurality of primary account numbers (PANs), each PAN being associated with a respective funding account:
receive, from a first site payment service associated with the first online community website, a payment request including a first payer pseudoaccount number, a first payee pseudo-account number and a first payer secret code, wherein the first payer pseudo-account number is based on a translation by the first site payment service from a first payer alias and wherein the first payee pseudo-account number is based on a translation by the first site payment service from a first payee alias;
map the first payer pseudo-account number to a corresponding PAN stored within the memory of the electronic payments network;
validate the first payer secret code, wherein the program is further configured to instruct the computer to compare the first payer secret code with a stored value for the first payer secret code and generate a validation code confirming a match of the first payer secret code with the stored value;
reformat the payment request into an authorization request message using a standard interchange payment message format;
transmit the authorization request message to the electronic payments network, the authorization request message including the corresponding PAN and the generated validation code; and
instruct the electronic payments network to route the authorization request message to an issuer computer device based on the corresponding PAN.

9. A medium in accordance with claim 8, further configured to instruct the computer to receive a second payment request at a second online community website payment service of a second community website, wherein a second payer alias used by the payer at the second community website is associated with the corresponding PAN.

10. A medium in accordance with claim 8,
further configured to instruct the computer to map a plurality of second payer pseudo-account numbers to corresponding PANs received from a plurality of second site payment services, respectively, wherein each of the first and second payer pseudo-account numbers is different from one another.

11. A medium in accordance with claim 8,
further configured to instruct the computer to:
receive, from the electronic payments network, a payment authorization response message including the corresponding PAN;
remap the corresponding PAN to the first payer pseudo-account number; and
transmit a payment disposition notification message to the first site payment service.

12. A medium in accordance with claim 8,
further configured to instruct the computer to:
determine that the first payer secret code does not match the stored value for the first secret code; and
transmit a failure disposition message to the first site payment service.

* * * * *